(12) United States Patent
Goodspeed

(10) Patent No.: US 10,004,218 B1
(45) Date of Patent: Jun. 26, 2018

(54) TERMITE SHIELD

(71) Applicant: Robert J. P. Goodspeed, Missouri City, TX (US)

(72) Inventor: Robert J. P. Goodspeed, Missouri City, TX (US)

( * ) Notice: Subject to any disclaimer, the term of this patent is extended or adjusted under 35 U.S.C. 154(b) by 0 days. days.

(21) Appl. No.: 15/649,487

(22) Filed: Jul. 13, 2017

(51) Int. Cl.
*E04B 1/72* (2006.01)
*A01M 1/24* (2006.01)
*A01M 1/00* (2006.01)

(52) U.S. Cl.
CPC ............. *A01M 1/24* (2013.01); *E04B 1/72* (2013.01); *A01M 1/00* (2013.01); *A01M 2200/011* (2013.01)

(58) Field of Classification Search
CPC .... A01M 1/24; A01M 1/00; A01M 2200/011; E04B 1/72
USPC .......................................................... 52/101
See application file for complete search history.

(56) References Cited

U.S. PATENT DOCUMENTS

| | | | | |
|---|---|---|---|---|
| 2,139,640 | A * | 12/1938 | Dorn | C23C 14/042 174/126.4 |
| 5,394,640 | A * | 3/1995 | Musket | A01M 1/14 43/114 |
| 5,678,362 | A | 10/1997 | Hulls et al. | |
| 5,802,779 | A * | 9/1998 | Hulls | E04B 1/72 43/124 |
| 5,860,266 | A | 1/1999 | Martinet et al. | |
| 6,362,224 | B2 | 3/2002 | Renello | |
| 6,370,834 | B1 | 4/2002 | Nickell | |
| 7,603,816 | B1 | 10/2009 | Hohmann, Jr. | |
| 2008/0282624 | A1 | 11/2008 | Francis et al. | |
| 2012/0047792 | A1 | 3/2012 | Sala et al. | |

* cited by examiner

*Primary Examiner* — Patrick J Maestri
(74) *Attorney, Agent, or Firm* — Richard L. Moseley

(57) ABSTRACT

A termite shield for protecting wooden frame structures comprising a cellulous sheet impregnated with a non repellant insecticide. The shield is placed between the sill/mudplate and the foundation and extends upward between the siding and interior space.

6 Claims, 2 Drawing Sheets

TERMITE SHIELD

FIELD OF THE INVENTION

The present invention relates to the field of insecticides and insect damage prevention. More particularly the invention relates to the prevention of termite damage in structures having wooden components. More particularly the invention relates to an insecticide impregnated termite shield placed between a concrete foundation and the sill/mudplate of a framing wall.

BACKGROUND OF THE INVENTION

Subterranean termites present a serious threat to structures, and particularly residential structures, throughout most of the United States and in many parts of the world. One of the most widely used techniques to combat termite infestation is the application of chemical agents to the ground under and around the structure. In a typical preconstruction treatment situation, a liquid form termiticide is sprayed at specified concentrations and volumes directly onto the compacted soil immediately before the concrete slab is poured, creating a horizontal barrier between any subterranean nests and the underside of the slab. Additional barriers are created in by boring holes into the flatwork soil at specified intervals (often 12-18 inches) or by digging trenches around the structure and spraying termiticide into the openings as well as mixing termiticide with the backfill soil. If treatment is required to control active infestation that occurs after construction, techniques include drilling holes in infested walls and injecting liquid or powdered termiticides between the walls, boring holes in the floor slab at spaced intervals and injecting liquid termiticides into the soil, and trenching around the base of the structure and applying termiticides as in pretreatment. The termiticides used in these applications are usually repellants which help in keeping the termites away from the structures, but kill them if they try to enter. The disadvantage of this type of treatment is that it starts to break down as soon as it is subjected to sunlight and moisture when placed into the soil. Fipronil is labeled from most manufactures for many species of insects and wood destroying insects.

Termite shields have also been used to prevent termites or other damage causing insects from entering a structure. These have been basically been impenetrable barriers, sometimes impregnated with termite repulsing materials.

SUMMARY OF THE INVENTION

The termite shield of the present invention is a porous flexible cellulous material impregnated with a attractive termiticide such as firponil. The impregnated cellulous material is applied in sheets between the wall and the concrete foundation of new construction. It is placed under the sill/mud plate and thence up the wall in the air space of brick veneer or behind the exterior siding upward to about 12 inches. Fipronil is not a repellant but rather attracts the termites to encourage them to eat the material.

DETAILED DESCRIPTION OF THE PREFERRED EMBODIMENT

Figure 1:
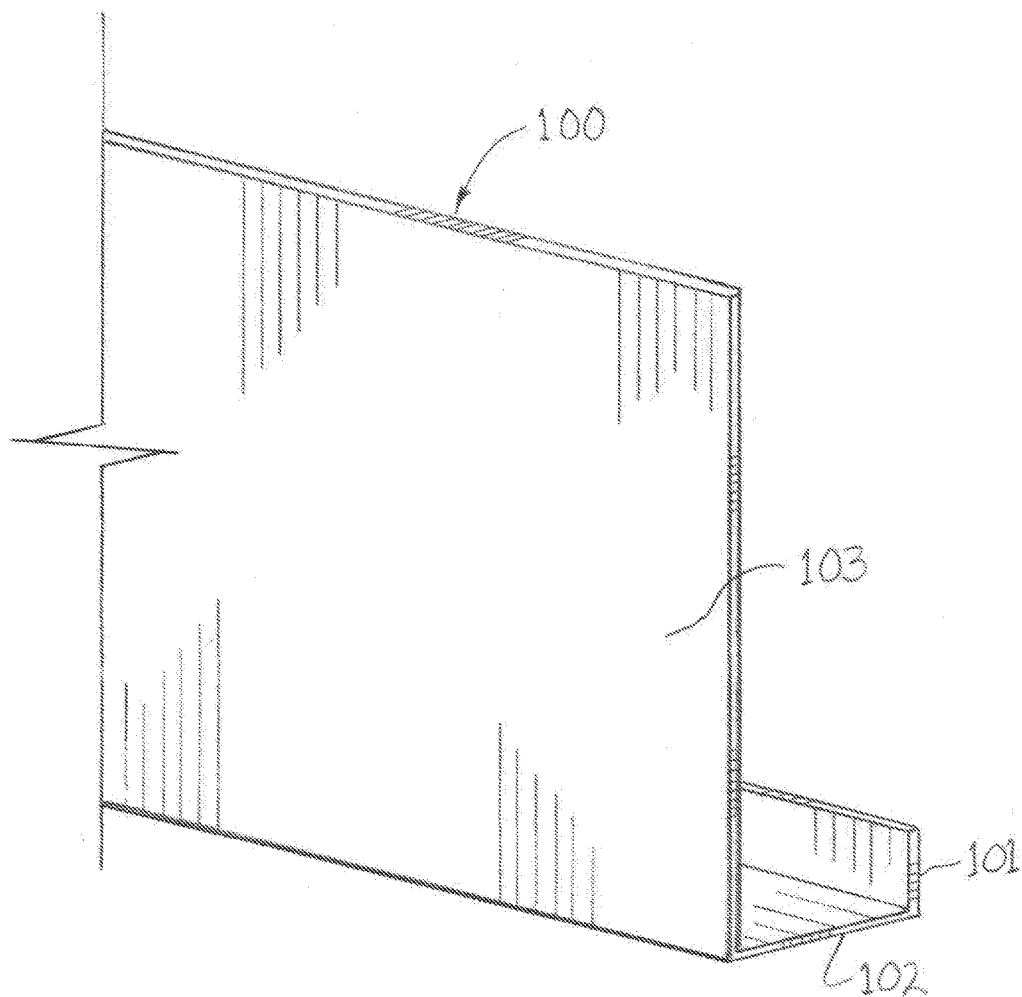
FIG. 1 is a perspective of the cellulous material which is impregnated with the non-repellant termiticide.

For a detailed description of the preferred embodiment the reader is directed to the attached Fig.s in which like components are given like reference numerals.

FIG. 1 shows a perspective view of the termite shield 100 comprising a sheet of cellulous material folded to present a first wall 101 which is about 1½" high; a base 102 which is about 3½" across and a second wall 103 which is about 12 inches tall. The cellulous material is impregnated with a termiticide which attracts insects, especially termites, and poisons them when they attempt to eat the cellulous material. A preferred termtiticie is fipronil.

Fipronil is a broad-spectrum insecticide that disrupts the insect central nervous system by blocking GABA-gated chloride channels and glutamate-gated chloride (GluCl) channels, resulting in central nervous system toxicity. This causes hyperexcitation of contaminated insects' nerves and muscles. Specificity of fipronil on insects may come from a better efficacy on GABA receptor, but also because GluCl channels do not exist in mammals. See U.S. Pat. No. 5,232,940.

The termiticide should be of the non repellant type so that the termites will eat at the impregnated cellulous material. Fipronil serves as a good bait toxin not only because of its slow action, but also because most, if not all, of the target insects do not find it offensive or repulsive.

The walls 101 and 103 and base 102 of the shield may be preformed by perforated folds but the shield is shipped in rolls for ease of application. Typically the shield is shipped as a sheet approximately 3/16 thick×17" wide and 48" in length, or 3/16" thick×17" wide continuous on a roll. The preformed perforated folds may be deleted if the material is to be used in more general construction.

Figure 2:
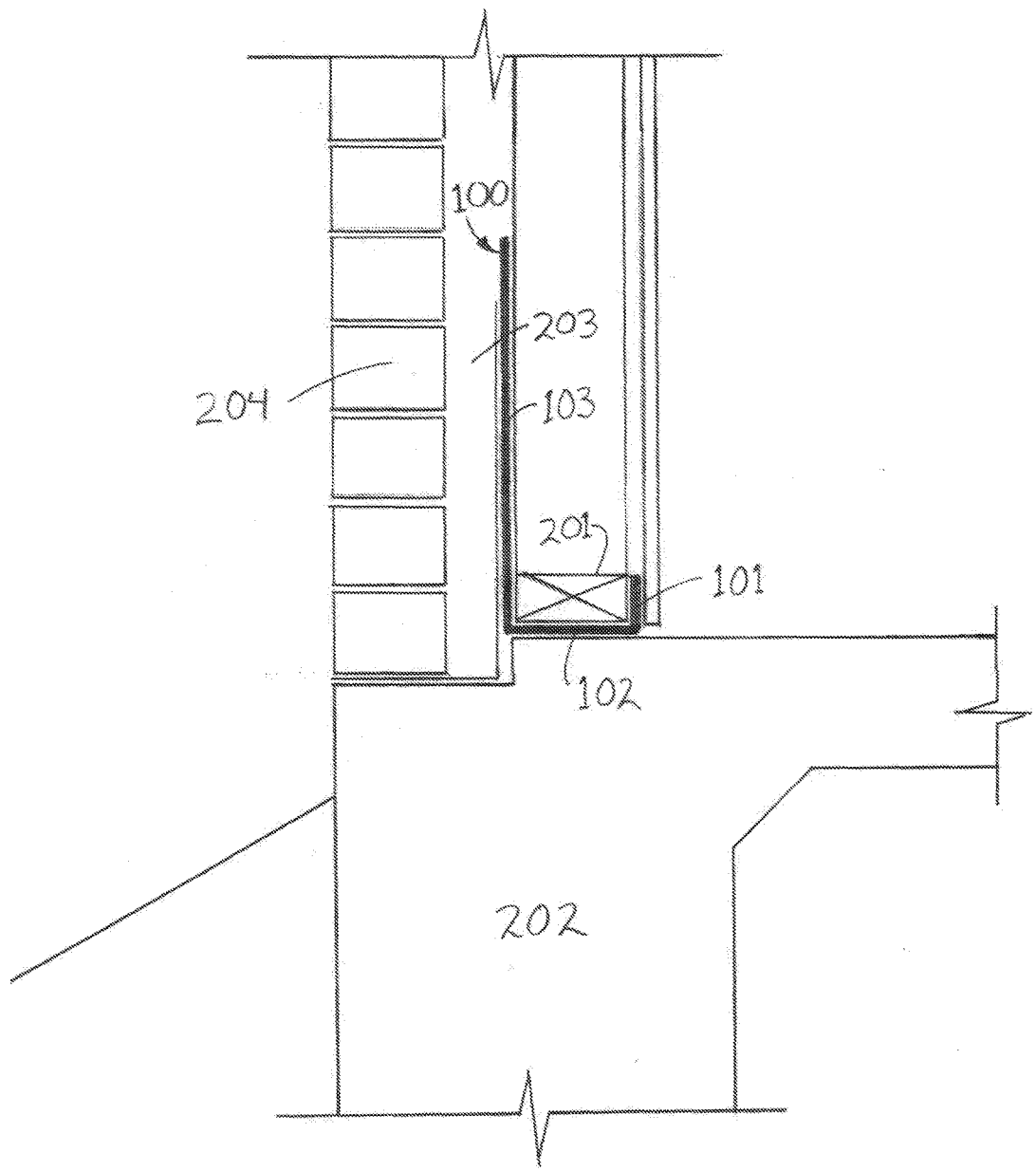
FIG. 2 is a side elevational view of the termite shield in use.

Referring now to FIG. 2 the installed product is shown in a wooden frame structure. The shield 100 is placed with the base 102 between the sill/mudplate 201 and foundation 202 and first wall 101 to the inside of the structure. The second wall 103 extends upward in the air space 203 of the brick veneer 204. Note that the walls and base fit snugly about the 2×4 stud which is used as the sill/mudplate.

The invention claims is:

1. A termite barrier comprising a sheet of cellulous material impregnated with a non repellant termiticide placed between a sill/mudplate and foundation of a wooden frame structure.

2. The termite barrier according to claim 1 wherein said non repellant termiticide comprises fipronil.

3. The termite barrier according to claim 2 wherein said sheet is seventeen inches wide and three sixteenths inches thick, and is provided with preformed perforations at one and one half inches from one side and five inches from the said one side.

4. A wooden frame structure having a termite shield comprising:
   a. a foundation (202);
   b. a sill/mud plate (201) comprising a wooden 2×4 having an inside surface and an outside surface resting on said foundation;
   c. an outer wall of brick veneer or siding (204) supported by said foundation; and
   d. a non repellant termiticide impregnated cellulous sheet (100) having a first wall (101) adjacent the inside surface of said sill/mudplate, a base (102) connected to said first wall and placed between said sill/mudplate (201) and said foundation (202), and a second wall (103) connected to said base and extending upward behind said outer wall (204).

5. The termite barrier according to claim 4 wherein said non repellant termiticide comprises fipronil.

6. The termite barrier according to claim 4 wherein said sheet is seventeen inches wide and three sixteenths inches thick, and is provided with preformed perforations at one and one half inches from one side and five inches from the said one side.

* * * * *